United States Patent [19]

Olin et al.

[11] Patent Number: 5,515,465
[45] Date of Patent: May 7, 1996

[54] FIBER OPTIC HULL PENETRATOR INSERT

[75] Inventors: Lester D. Olin, Mystic; Roger L. Morency, Voluntown, both of Conn.

[73] Assignee: The United States of America as represented by the Secretary of the Navy, Washington, D.C.

[21] Appl. No.: 394,194

[22] Filed: Jul. 1, 1982

[51] Int. Cl.[6] .............................. G02B 6/38; H02G 3/00
[52] U.S. Cl. .............................. 385/64; 174/70 S; 385/54; 385/55; 385/56; 385/59
[58] Field of Search .............................. 350/96.2, 96.21; 174/70 B, 70 C, 70 S; 385/54, 55, 56, 59, 64

[56] References Cited

U.S. PATENT DOCUMENTS

| | | | |
|---|---|---|---|
| 2,592,780 | 4/1952 | Woods | 174/70 S |
| 4,312,563 | 1/1982 | Mead | 350/96.2 |
| 4,360,249 | 11/1982 | Slemon | 350/96.2 |
| 4,411,491 | 10/1983 | Larkin et al. | 350/96.2 |
| 4,412,721 | 11/1983 | Saatze | 350/96.2 |
| 4,472,052 | 9/1984 | Lofgren | 350/96.2 |

*Primary Examiner*—Stephen C. Buczinski
*Attorney, Agent, or Firm*—Michael J. McGowan; Prithvi C. Lall; Michael F. Oglo

[57] ABSTRACT

A fiber optic hull penetrator comprises a penetrator insert and a penetrator plug that each have fiber alignment inserts mounted, molded or adhered to them. The penetrator insert and penetrator plug are designed to provide strain relief to the cable, spring loading to the fiber alignment inserts, and a waterproof pressure boundary seal when subjected to the submarine ocean and combatant environment. Each fiber alignment insert is a solid slug of material to which anchor pin holes, strength member holes, locating key holes have been added to which suitable components are affixed or inserted.

8 Claims, 1 Drawing Sheet

U.S. Patent          May 7, 1996          5,515,465
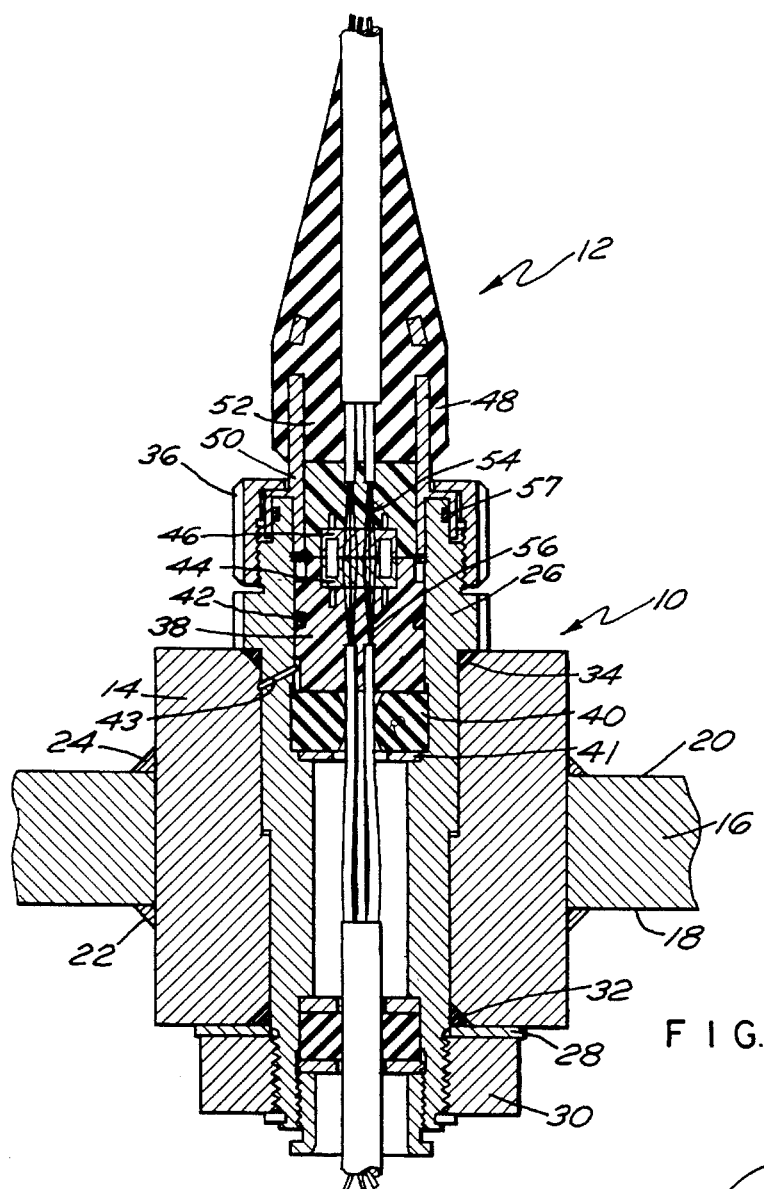
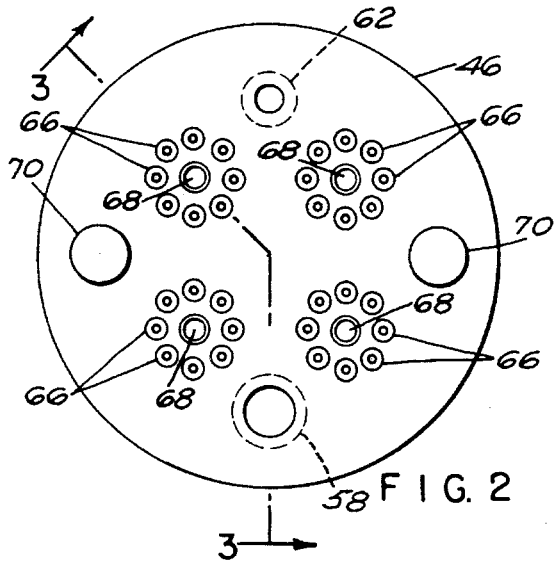
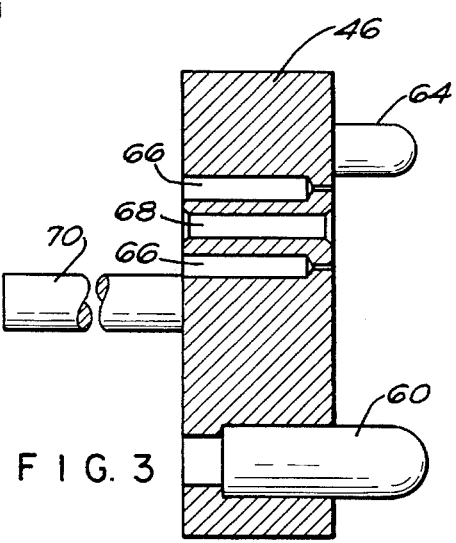

FIBER OPTIC HULL PENETRATOR INSERT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to fiber optic hull penetration or bulkhead penetration. The connectors used in the penetration are to be suitable to interconnect multiple single or bundle fiber optic leads in an underwater pressure differential environment.

2. Description of the Prior Art

The development of fiber optic connectors to present has been devoted primarily to land based telecommunication and land based military applications in a ferrule-to-ferrule configuration. As a result, there are no known planar, waterproof, pressure differential multichannel penetrators.

SUMMARY OF THE INVENTION

The purpose of the fiber optic hull penetrator is the efficient transmission of modulated light from multiconductor, interchangeable outboard submarine cable across a pressure differential, waterproof, demateable interface to inboard submarine cable. The efficiency of the light transmission is accomplished by the precision of the fiber alignment inserts in the two halves of the connector. The design of the hull penetrator, the materials utilized; and the method of affixing the assembly to the hull are required to maintain the waterproof integrity of the submarine hull under operational and combatant conditions.

The invention provides efficient light transmission by the precise positioning and polishing of the individual or bundle fiber in the fiber alignment holes of the fiber alignment inserts. The fiber alignment inserts are subsequently mounted, molded, or adhered to the hull penetrator body insert and plug.

The principal advantage of invention is the size reduction of approximately one-half when compared to currently available electrical penetrators, thus reducing the number and size of hull penetrations. The fiber density can easily be varied by changing the configuration of the fiber alignment inserts. The fiber alignment insert can be changed to accept single fiber conductors or bundle fiber conductors of various sizes. The hull insert and penetrator body are totally reusable. The process by which the bonding agent is applied allows for an automatic self-centering of each fiber in its respective hole.

BRIEF DESCRIPTION OF THE DRAWINGS

FIG. 1 is a drawing of a fiber optic hull penetrator connector assembly in accordance with the present invention;

FIG. 2 is an enlarged rear view of either one of the fiber optic inserts within the fiber optic hull penetrator connector assembly of FIG. 1; and FIG. 3 is a sectional view of either one of the fiber optic inserts shown along the lines 3—3 of FIG. 2.

DESCRIPTION OF THE PREFERRED EMBODIMENT

Referring now to FIG. 1 there is shown a hull penetrator connector assembly 10 and a plug connector assembly 12. The hull insert 14 is welded to the hull 16 both inboard 18 and outboard 20. The welds 22 and 24 must be watertight and withstand a pressure differential.

The hull insert 14 encloses a "K" monel connector body 26 that is held in place by a "K" monel washer 28 and a "K" monel nut 30. Watertight integrity is maintained by O-rings 32 and 34.

The plug connector half 12 is affixed to the hull connector half 10 by means of threaded brass nut 36. The hull connector body 26 houses a molded assembly 38 that has an elastomeric shock spring 40 interfacing the molded assembly 38 and the connector body 26. The spring 40 is held in place by washer 41. Keying pin 43 properly aligns molded assembly 38. Watertight integrity is maintained between the molded assembly 38 and the connector body 26 by means of an O-ring 42. The molded assembly 38 contains a titanium fiber alignment insert 44. The hull connector half 10 is aligned with the plug connector half 12. The plug half contains a titanium fiber insert 46 which is encased within plug shell 48 with an epoxy molding compound 50 and the shell 48 is encased in an elastomeric molding compound 52. Penetrator fiber alignment insert 44 and plug fiber alignment insert 46 are identical. Fiber optic leads 54 and 56 are shown being received by alignment insert 46 and 44 respectively. Watertight integrity between hull connector half 10 and plug connector half 12 is maintained by O-ring 57.

FIGS. 2 and 3 show enlarged views of a fiber alignment insert 46. Since plug fiber alignment insert 46 is identical to penetrator insert 44 separate views of insert 44 are not necessary.

Referring now to FIGS. 2 and 3 there is shown the fiber alignment insert 46 made of titanium for the purpose of corrosion resistance and to minimize the mass. The insert 46 has a large locating keying pin aperture 58 that has a locating pin 60 inserted. There is also a small locating keying pin aperture 62 having a locating pin 64. Fiber optic conductor holes 66 are counterbored for holding the jacketed fiber. To connect the fiber leads to conductor holes 66, an epoxy bonding agent is drawn through conductor holes 66 by vacuum means. A plurality of strength member holes 68 are also provided. Permanent anchor pins 70 are inserted in the after end of insert 46. Pin 70 provides anchor points and adds torsional strength when the insert 46 is potted. In operation, signals on fiber optic leads 54 are transmitted through inserts 46 and 44 to leads 56. It is to be noted that the fiber guide holes 66 that transmit signals have no mechanical interlocking as in a normal pin and socket arrangement. The spring loading design accomplished by the elastomeric spring provide continual interface contact when subjected to shock waves encountered in a hostile environment.

The design permits repolishing without disassembly of components. It would be advisable to do this during major overhauls. The fiber lead faces have a separation of substantially one mil. This can be maintained by either a transparent elastomer film or an index matching gel.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. A fiber optic hull penetrator insert assembly comprising:

first and second fiber alignment disk inserts with each insert having front and back flat surfaces and a plurality of fiber guide apertures extending the entire length of each of said disk inserts parallel to the axis of each of said disk inserts, a locating pin aperture of a first size located in each of said disk inserts and a locating pin aperture of a second size located in each of said disk inserts;

a plurality of anchor pins with each of said disk inserts having at least one of said anchor pins affixed to it; and a locating pin of a first size and a locating pin of a second size adapted to be inserted respectively in the locating pin apertures of said first and second size in both said first and second disk inserts to connect said first and second disk inserts and to align without any mechanical connection the respective fiber guide apertures of said first and second disk inserts.

2. A fiber optic hull penetrator insert assembly according to claim 1 wherein said plurality of fiber guide apertures of said fiber alignment disk inserts are counterbored with the smaller aperture of said counterbore of each disk extending from said front flat surface of each disk insert.

3. A fiber optic hull penetrator insert according to claim 2 wherein said anchor pins of each of said disk inserts extend from said back flat surface of each disk insert.

4. A fiber optic hull penetrator insert assembly according to claim 3 further comprising strength member apertures in each of said disk inserts.

5. A fiber optic hull penetrator assembly comprising:

a hull penetrator connector assembly having a hull insert adapted to penetrate and be welded to a hull, said hull insert enclosing a connector body that houses a molded assembly, an elastomeric shock spring interfacing said molded assembly and said connector body, O-rings being located between said connector body and both said molded assembly and said hull insert for watertight integrity, said molded assembly containing fiber optic leads and a first fiber alignment disk insert having front and back flat surfaces and a plurality of fiber guide apertures extending the entire length of said first disk insert parallel to the axis of said disk insert, said fiber optic disk leads being centered in said fiber guide apertures, a locating pin aperture of a first size and a locating pin aperture of a second size being located in the first disk insert, at least one anchor pin being affixed to said first disk insert:

a plug connector assembly having a threaded nut for a connection to the hull penetrator connector assembly, said plug connector assembly further including a second fiber alignment disk insert receiving fiber optic leads, said second disk insert and leads being encased within a plug shell with an epoxy molding compound, said plug shell being encased in an elastomeric molding compound, said second disk insert having front and back flat surfaces and a plurality of fiber guide apertures extending the entire length of said second disk insert parallel to the axis of said second disk insert, said fiber optic disk leads being centered in said fiber guide apertures, a locating pin aperture of a first size and a locating pin aperture of a second size being located in said second disk insert, at least one anchor pin being affixed to said second disk insert; and a locating pin of a first size and a locating pin of a second size being adapted to be inserted respectively in the locating pin apertures of said first and second size in both said first and second disk inserts to connect said first and second disk inserts and to align, without any mechanical connection, the respective fiber guide apertures of said first and second disk inserts.

6. A fiber optic hull penetrator assembly according to claim 5 wherein said plurality of fiber guide apertures of said first and second fiber alignment disk inserts are counterbored with the smaller aperture of said counterbored or each disk extending from said front flat surface of each disk insert.

7. A fiber optic hull penetrator assembly according to claim 6 wherein said anchor pins of each of said disk inserts extending from said back flat surface of each disk insert.

8. A fiber optic hull penetrator assembly according to claim 7 further comprising strength member apertures in each of said disk inserts.

* * * * *